United States Patent
Kuwabara et al.

(10) Patent No.: US 7,104,079 B2
(45) Date of Patent: Sep. 12, 2006

(54) HEAT PUMP

(75) Inventors: Osamu Kuwabara, Gunma (JP);
Hiroshi Mukaiyama, Gunma (JP);
Masahiro Kobayashi, Gunma (JP);
Ichiro Kamimura, Gunma (JP);
Hirokazu Izaki, Tochigi (JP);
Toshikazu Ishihara, San Jose, CA (US)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 10/344,699

(22) PCT Filed: Jul. 2, 2002

(86) PCT No.: PCT/JP02/06684

§ 371 (c)(1),
(2), (4) Date: Feb. 25, 2003

(87) PCT Pub. No.: WO03/004947

PCT Pub. Date: Jan. 16, 2003

(65) Prior Publication Data

US 2004/0020230 A1 Feb. 5, 2004

(30) Foreign Application Priority Data

Jul. 2, 2001 (JP) ............................. 2001-200413

(51) Int. Cl.
*F25D 21/00* (2006.01)
(52) U.S. Cl. ........................................ 62/234; 62/238.7
(58) Field of Classification Search ............... 62/238.6, 62/238.7, 504, 513, 515, 519, 234
See application file for complete search history.

(56) References Cited

U.S. PATENT DOCUMENTS

| 4,205,532 A | | 6/1980 | Brenan ......................... 62/115 |
| 4,262,496 A | * | 4/1981 | Bell, Jr. ....................... 62/504 |
| 4,265,094 A | | 5/1981 | Haasis, Jr. .................. 62/238.6 |
| 4,680,941 A | * | 7/1987 | Richardson et al. ........... 62/184 |
| 4,907,738 A | * | 3/1990 | Harris ......................... 237/2 B |
| 4,955,207 A | * | 9/1990 | Mink .......................... 62/238.6 |
| 4,957,157 A | * | 9/1990 | Dowdy et al. .......... 165/104.27 |
| 5,099,651 A | * | 3/1992 | Fischer ........................... 62/79 |
| 5,212,965 A | * | 5/1993 | Datta ............................ 62/515 |
| 5,553,463 A | | 9/1996 | Pointer ...................... 62/238.6 |
| 6,112,547 A | | 9/2000 | Spauschus et al. ........... 62/476 |

(Continued)

FOREIGN PATENT DOCUMENTS

DE   30 27 512 A1   2/1982

(Continued)

OTHER PUBLICATIONS

Tanaka et al., "Cooling Device", Feb. 1994, JPO, 06-050635, all.*

(Continued)

*Primary Examiner*—Mohammad M. Ali
(74) *Attorney, Agent, or Firm*—Armstrong, Kratz, Quintos, Hanson & Brooks, LLP

(57) ABSTRACT

A heat pump apparatus that having a refrigerating cycle including a compressor, a gas cooler, a pressure reducing device and an evaporator and is designed so that water can be heated by the gas cooler. A refrigerant such as $CO_2$ or the like working in a supercritical area is filled and used at a high-pressure side in the refrigerating cycle and a radiator is equipped between the exit of the gas cooler and the pressure reducing device. The refrigerant temperature at the exit of the radiator is kept at a substantially fixed temperature irrespective of the temperature of hot water to the gas cooler.

5 Claims, 4 Drawing Sheets

U.S. PATENT DOCUMENTS 6,574,977 B1 * 6/2003 Ozaki et al. .................. 62/210

FOREIGN PATENT DOCUMENTS

| JP | 52-063250 | 11/1950 |
| JP | 08-327192 | 12/1996 |
| JP | 11-337282 | 12/1999 |
| JP | 2001-082803 | 3/2001 |
| JP | 2001-108317 | 4/2001 |
| JP | 2001-153476 | 6/2001 |
| JP | 2002-106960 | 4/2002 |
| JP | 2002-106988 | 4/2002 |
| JP | 2002-139257 | 5/2002 |

OTHER PUBLICATIONS

Copy of European Search Report dated Oct. 13, 2005, 3 pages.
Patent Abstracts of Japan, vol. 2000, no. 03, Mar. 30, 2000.

* cited by examiner

HEAT PUMP

BACKGROUND OF THE INVENTION

1. Field of the Invention

The present invention relates to a heat pump apparatus, and more particularly to a heat pump apparatus which can enhance the defrosting efficiency of an evaporator and suppress variation of the optimum refrigerant filing amount when the temperature of water being supplied is varied in a heat pump type hot water supply apparatus designed so as to supply hot water heated by a gas cooler.

2. Description of the Related Art

There is known a heat pump type hot water supply apparatus that generally has a refrigerating cycle including a compressor, a gas cooler, a pressure reducing device and an evaporator and is designed to supply hot water heated by the gas cooler.

For example, when $CO_2$ refrigerant is used as a refrigerant in a refrigerating cycle in this type of apparatus, it is expected that a high coefficient of performance (COP) can be achieved in a heating process having a large water-temperature rise-up range because there is established a transcritical cycle in which the high pressure side is set to a supercritical state in the refrigerating cycle.

In this type of heat pump type hot water supply apparatus, when the temperature of water supplied to the gas cooler is low, for example, about 5° C., $CO_2$ refrigerant discharged from the compressor is heat-exchanged with low-temperature water of about 5° C. in the gas cooler and cooled to a low temperature until it has the same level density as liquid (hereinafter referred to as a liquid state). Thereafter, the $CO_2$ refrigerant is expanded, fed to the evaporator, completely evaporated to a gaseous state in the evaporator and then circulated to the compressor.

On the other hand, when the temperature of water being supplied to the gas cooler is high, for example, about 50° C., $CO_2$ refrigerant is heat-exchanged with high temperature water of about 50° C., and thus the $CO_2$ refrigerant is not so cooled. Therefore, it is fed to the exit of the gas cooler while being kept under a high-temperature gas state, expanded and then circulated to the evaporator and further to the compressor.

There is a problem in that when the temperature of water being supplied is varied and the temperature at the exit of the gas cooler is varied, the density of the refrigerant is varied. When the refrigerant density is greatly varied, there occurs a difference in the optimum amount of refrigerant being circulated between the case where the supply water temperature is high and the case where the supply water temperature is low because the volume of the refrigerating cycle is constant. When some difference occurs in the optimum refrigerant amount, if refrigerant is filled so as to support a driving operation which requires a large optimum refrigerant amount, there would occur various problems such as surplus refrigerant occurring in a driving operation requiring a small optimum refrigerant amount and, thus, a receiver tank or the like for temporarily stocking the surplus refrigerant is needed, that the control for achieving the optimum refrigerant amount is complicated, etc.

Furthermore, in this type of heat pump hot water supply apparatus, parts constituting the refrigerating cycle are disposed as a heat pump unit outdoors in many cases, and it is frequently required to carry out a defrosting operation on the evaporator. In this case, the defrosting operation has generally used a so-called "hot gas" defrosting operation in which the refrigerant discharged from the compressor is directly supplied to the evaporator while bypassing the gas cooler and the pressure-reducing device to heat the evaporator with the heat of the refrigerant, thereby defrosting the evaporator.

However, for example, when the hot gas defrosting operation is carried out under a condition such that the outside air temperature is extremely low and extremely fine powdery snow is falling, there may be a case where the amount of powder snow attached to the evaporator is excessively large and, thus, the evaporator cannot be sufficiently defrosted.

Furthermore, it is common that the gap between the bottom plate (drain pan) of the heat pump unit and the lower portion of the evaporator is extremely narrow. There may be a case where drain remaining in the gap is frozen and ice is grown up from the lower side with the frozen drain as a shell. In such a region in which some days on which the temperature drops below 0 degree centigrade are continued, it is difficult to efficiently remove ice thus grown up.

It may be considered that an electric heater or the like is disposed to perform defrosting, however, this increases the contract demand of electric power and thus increases the operating cost.

Therefore, an object of the present invention is to solve the problem of the prior art described above and provide a heat pump apparatus that can suppress a variation of an optimum refrigerant amount to be circulated when the temperature of supply water is increased with a simple construction and also efficiently defrost an evaporator.

SUMMARY OF THE INVENTION

According to the present invention, in a heat pump apparatus that has a refrigerating cycle including a compressor, a gas cooler, a pressure reducing device and an evaporator and is designed so that water can be heated by the gas cooler, a refrigerant working in a supercritical area is filled and used at a high-pressure side in the refrigerating cycle and a radiator is equipped between the exit of the gas cooler and the pressure reducing device.

The refrigerant temperature at the exit of the radiator is preferably kept at a substantially constant temperature irrespective of the temperature of supply water to the gas cooler.

The radiator is preferably disposed at the lower portion of the evaporator.

The radiator is preferably constructed by a part of a refrigerant pipe extending from the gas cooler to the pressure reducing device.

The evaporator is preferably a fin tube type heat exchanger, and the part of the refrigerant pipe is preferably disposed so as to penetrate through the lower portion of the fin of the evaporator.

The refrigerant is preferably $CO_2$ refrigerant.

According to the present invention, the refrigerant temperature at the exit of the radiator is kept at a substantially constant temperature irrespective of the temperature of supply water to the gas cooler, so that the refrigerant density at the exit of the radiator is substantially constant irrespective of the temperature of the supply water.

Furthermore, because the refrigerant density is substantially constant and the volume of the refrigerating cycle is constant, the amount of the refrigerant being circulated is constant and thus the variation of the optimum refrigerant amount can be suppressed.

Still furthermore, when the radiator is disposed at the lower portion of the evaporator, the evaporator can be efficiently defrosted with a simple construction.

DETAILED DESCRIPTION OF THE PREFERRED EMBODIMENTS

Embodiments of the present invention will be described with reference to the drawings.

Figure 1:
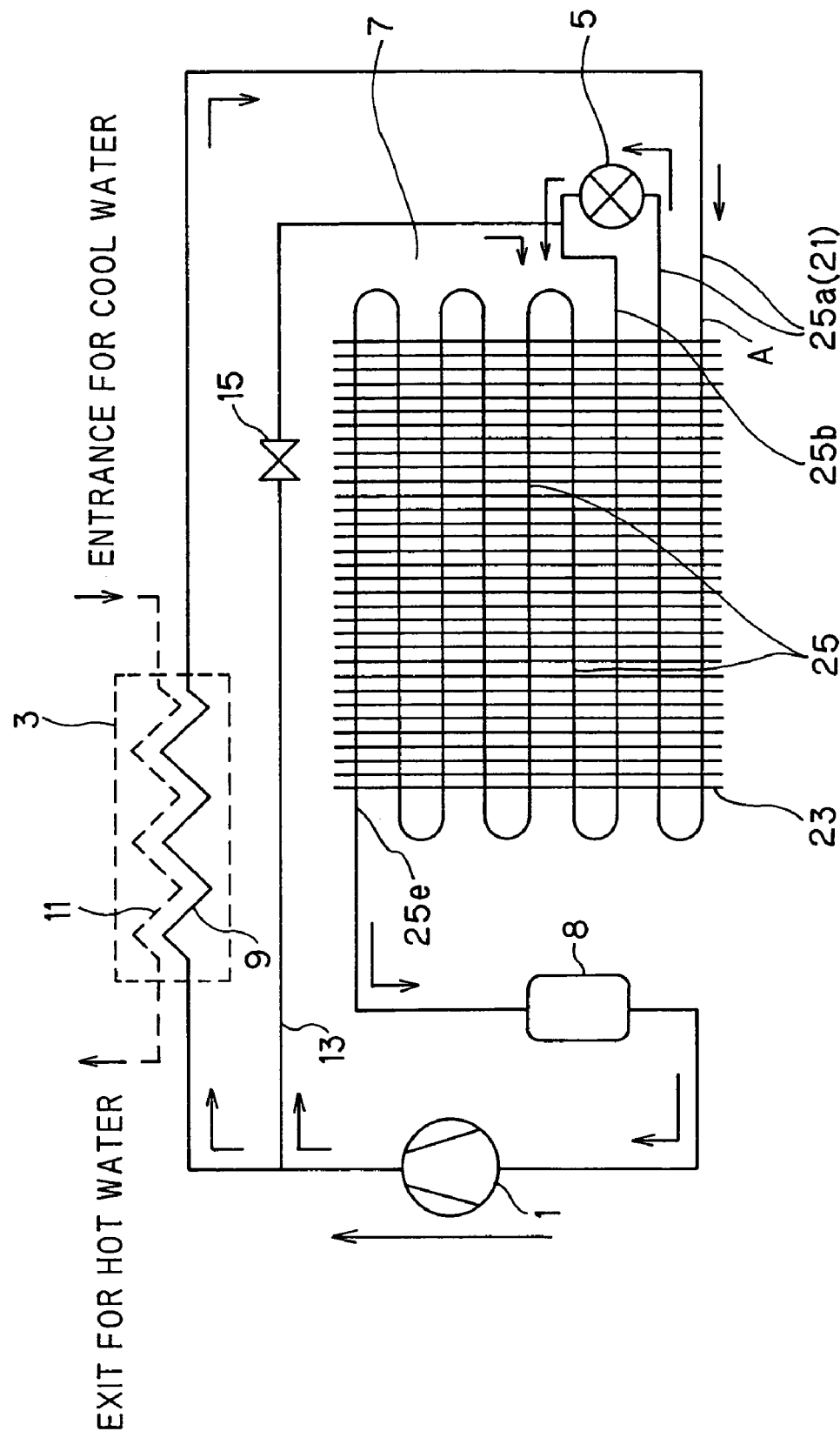
FIG. 1 is a circuit diagram showing an embodiment of a heat pump apparatus according to the present invention.

In FIG. 1, reference numeral 1 represents a compressor, and a gas cooler 3, a pressure reducing device (expansion valve) 5, an evaporator 7 comprising a fin tube type air heat-source type heat exchanger, and an accumulator 8 are connected in this order to the compressor 1 through a refrigerant pipe, as indicated by a solid line to thereby constitute a refrigerating cycle.

$CO_2$ refrigerant is filled and used in the refrigerating cycle. The ozone depletion coefficient of $CO_2$ refrigerant is equal to 0, and the global warming potential thereof is equal to 1. Therefore, this refrigerant has a small load on the environment, has no toxicity and no inflammability, and is safe and low in cost.

The gas coil 3 comprises a refrigerant coil 9 indicated by a solid line through which $CO_2$ refrigerant flows, and a water coil 11 indicated by a broken line through which water flows, and the water coil 11 is connected through a water pipe to a hot water storage tank omitted from the illustrations of the figures. The water pipe is connected to a circulating pump omitted from the illustrations of the figures. The circulating pump is driven so that the water in the hot water storage tank is circulated and heated in the gas cooler 3 and then stored into the hot water storage tank.

The heat pump type hot water supply apparatus is disposed as a heat pump unit outdoors, and it is required to carry out a defrosting operation to remove frost attached to the evaporator 7. In this case, the defrosting operation is carried out by directly supplying the refrigerant discharged from the compressor 1 through the bypass pipe 13 to the evaporator 7 to heat the evaporator 7. The bypass pipe 13 bypasses the gas cooler 3 and the expansion valve 5. A normally-dosed type defrosting electromagnetic valve 15 equipped in the bypass pipe 13 is opened under the defrosting operation.

In this embodiment, a part (radiator) 21 of the refrigerant pipe extending from the gas cooler 3 to the expansion valve 5 is disposed at the lower portion of the evaporator 7.

The evaporator 7 is a fin-tube type air heat-source type heat exchanger. Meandering tubes 25 are disposed so as to penetrate through holes formed in a plurality of fins 23, 23, 23, . . . , and the substantially U-shaped tube 25a at the lowermost portion is set to correspond to the part 21 of the refrigerant pipe. The expansion valve 5 is connected between the substantially U-shaped tube 25a and the tube 25 at the downstream side of the tube 25a.

Figure 2:
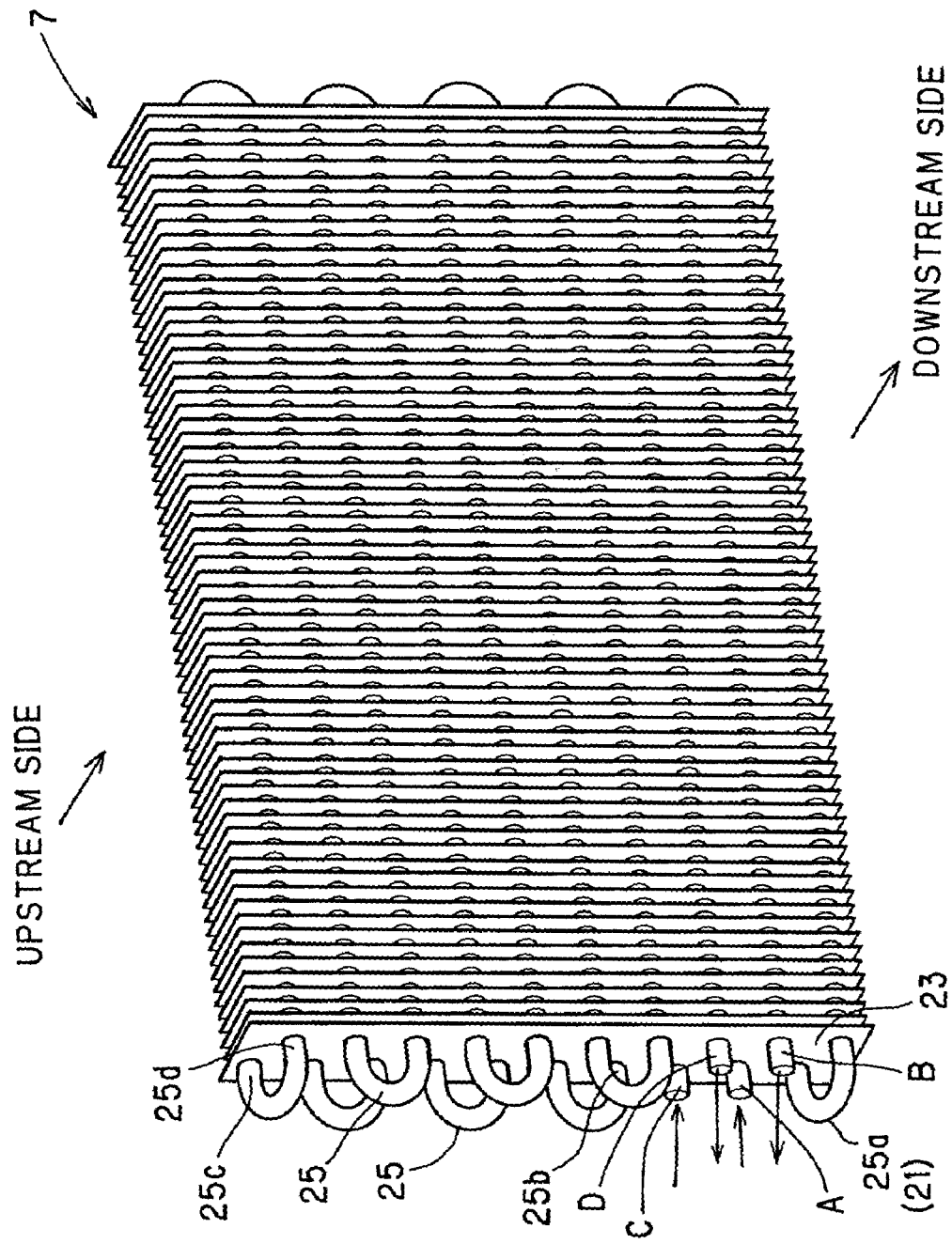
FIG. 2 is a perspective view showing an evaporator.

FIG. 2 is a perspective view showing the evaporator 7.

In this evaporator 7, the tubes 25 are arranged in two lines from the upstream side to the downstream side in the air flowing direction, and the substantially U-shaped tube (a part of the refrigerant pipe) 25a is disposed so as to penetrate through the lower portions of the fins 23.

High-pressure refrigerant cooled by the gas cooler 3 flows into the tube 25a. The refrigerant flows through an inlet pipe A, passes through the tube 25a meandered at three times, and then flows out from an outlet pipe B to the expansion valve 5. After being expanded in the expansion valve 5, the refrigerant flows into the evaporator 7 through an inlet pipe C located at the upstream side in the air flowing direction just above the tube 25a, and then flows into a tube 25b at the upstream side in the air flowing direction after meandering once. Further, the refrigerant thus flowing into the tube 25b is meandered several times through the tube 25 located at the upstream side in the air flowing direction, and shifts from the uppermost tube 25c at the upstream side in the air flowing direction to a tube 25d at the downstream side in the air flowing direction. The refrigerant flowing into the tube 25d flows downwardly through the tube 25 located at the downstream side in the air flowing direction, and then flows out from the lowermost outlet pipe D to the compressor 1.

Figure 3:
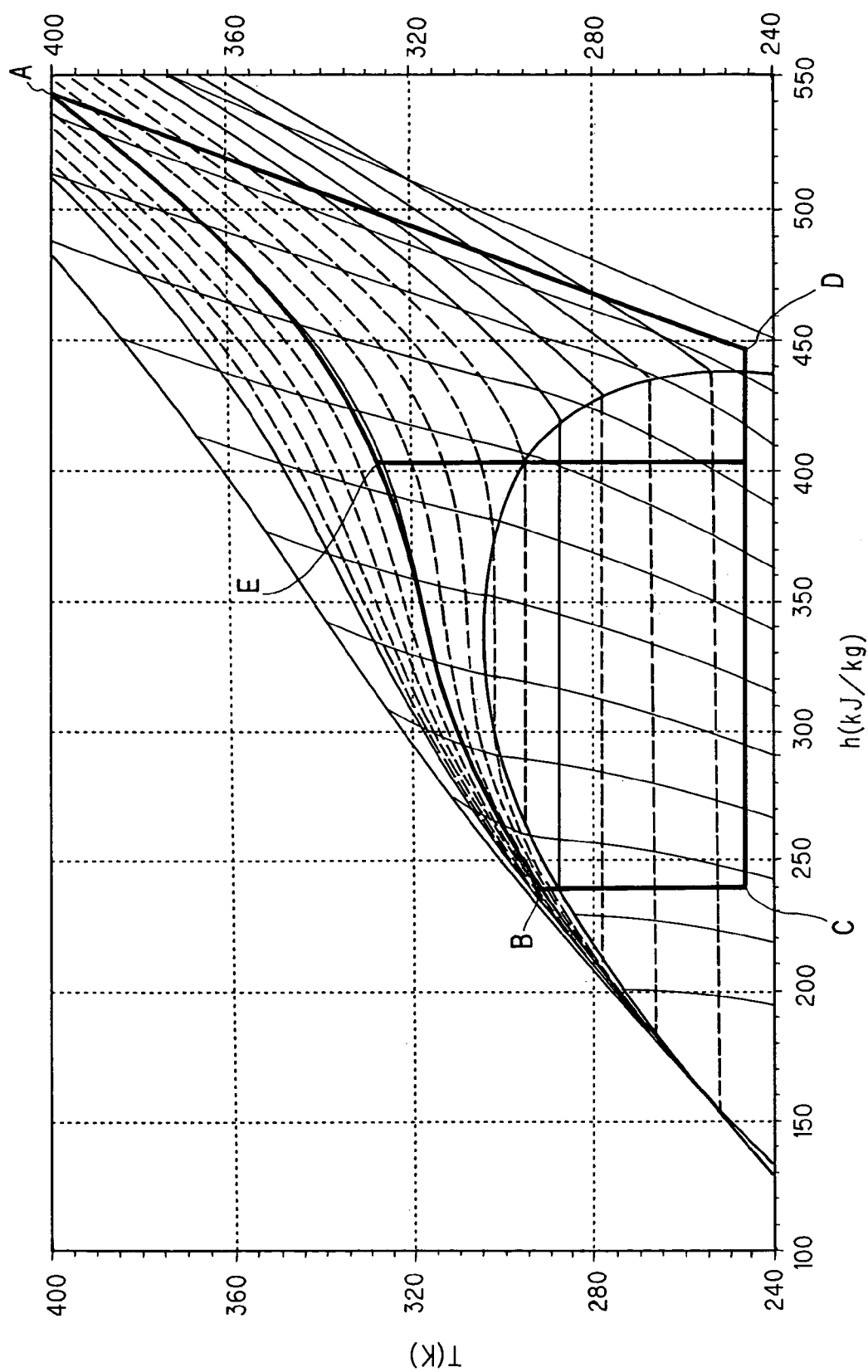
FIG. 3 is a T-h graph.

FIG. 3 shows a T-h graph.

In the heat pump type hot water supply apparatus, for example, when the temperature of supply water to be fed to the water coil 11 is low, for example, 5° C. under winter-season operation, as shown in the T-h graph of FIG. 3, $CO_2$ refrigerant is discharged (point A) at the compressor 1, and cooled through the heat exchange with water of about 5° C. in the gas cooler 3. Thereafter, $CO_2$ refrigerant thus cooled flows into the radiator 21 and is further cooled through the heat exchange with air. The refrigerant is passed through the exit (point B) of the radiator 21 while the density thereof is substantially near to that of the liquid (liquid state), and then expanded in the expansion valve 5. The refrigerant thus expanded reaches the entrance of the evaporator 7 (point C) to be completely evaporated in the evaporator 7, and then circulated to the suck-in portion of the compressor 1 (point D).

In this case, because the supply water temperature is low, that is, about 5° C., it is expected that the refrigerant state is close to the point B at the exit of the gas cooler 3 and thus it is set to substantially the liquid state, so that the cooling effect cannot be so greatly brought out.

On the other hand, when the supply water temperature is high, for example, about 50° C., $CO_2$ refrigerant discharged (point A) from the compressor 1 is cooled through the heat-exchange with the high-temperature water of about 50° C. in the gas cooler 7. In this case, it is expected that the refrigerant state substantially corresponds to the point E at the exit of the gas cooler 3 and, thus, it does not reach the liquid state, but substantially the gas state. The refrigerant passed from the exit of the gas cooler 3 (point E) reaches the radiator 21 to be cooled through the heat exchange with the air, and, thus, reaches substantially the liquid state. Further, the refrigerant under the liquid state reaches the exit of the radiator 21 (point B). After passing through the exit (point B), the refrigerant is expanded in the expansion valve 5, reaches the entrance of the evaporator 7 (point C) to be completely evaporated in the evaporator 7, and is then circulated to the inlet portion of the compressor 1 (point D).

The above cycle becomes the transcritical cycle in which the supercritical state is set at the high-pressure side, and thus high COP is achieved.

In this embodiment, the radiator 21 is equipped between the exit of the gas cooler and the pressure reducing device 5, so that the refrigerant temperature at the exit of the radiator 21 (the point B) can be set to a substantially constant value in both the cases where the temperature of supply water to be supplied to the water coil 11 is low and where it is high.

That is, the refrigerant temperature at the exit of the radiator 21 (point B) is kept to a substantially constant temperature irrespective of the temperature of water supplied to the gas cooler 7. However, actually, the temperature of the radiator is varied, and thus the temperature at the point B is slightly varied.

Accordingly, even when the supply water temperature is low and also when the supply water temperature is high, the density of the refrigerant circulated in the refrigerating cycle can be set to be substantially constant, and also the volume of the refrigerating cycle (the volume of the radiator 21, the evaporator 7, etc.) is fixed, so that no difference in optimum refrigerant amount occurs resulting from the variation of the supply water temperature, and thus the variation of the optimum refrigerant amount can be suppressed.

Accordingly, the increase of the pressure at the high-pressure side can be suppressed, the reduction in efficiency due to increase of compression ratio can be suppressed, and no surplus refrigerant occurs, unlike the prior art. Therefore, a receiver tank or the like for temporarily stocking the surplus refrigerant is unnecessary, and thus the control for achieving the optimum refrigerant amount is not complicated.

The radiator 21 can be manufactured as a part of the evaporator 7, and also an air blower for the evaporator 7 can be used commonly to the radiator 21. Therefore, the initial cost can be suppressed and the energy saving can be performed because no other cooling source is required.

Furthermore, in this embodiment, the high-pressure refrigerant cooled by the gas cooler 3 flows into the lower portion of the evaporator 7 at all times during hot-water supply operation.

When it is assumed that the refrigerant temperature at the exit of the gas cooler 3 is higher than the temperature of water to be supplied to the gas cooler 3, the temperature of water supplied there is kept to 0° C. or more in consideration of freezing preventing equipment for a water pipe, etc., so that the refrigerant temperature at the exit of the gas cooler 3 is kept to 0° C. or more.

Accordingly, during hot-water supply operation, the temperature of the lower portion of the evaporator 7 is kept to 0° C., and the drain freezing at the lower portion of the evaporator 7 can be prevented.

The hot water supply operation is switched to the defrosting operation in accordance with the difference between the evaporation temperature in the evaporator 7 and the outside air temperature under hot water supply operation. In this case, hot gas under defrosting operation flows into the tube 25b of the evaporator 7, flows therefrom through the tube 25 at the upstream side while meandering at plural times, shifts from the uppermost tube 25c at the upstream side to the tube 25d at the downstream side in the air flowing direction, downwardly flows through the tube 25 at the downstream side and then flows out from the lowermost pipe D at the exit side to the compressor 1, whereby the evaporator 7 is heated to melt frost attached to the evaporator 7, and the drain is downwardly discharged.

In this embodiment, even when the discharged drain is stocked at the lower portion of the evaporator 7, the high-pressure refrigerant passing through the gas cooler 3 flows into the substantially U-shaped tube 25a under hot water supply operation, so that the temperature of the lower portion of the evaporator 7 is kept at 0° C. or more. Therefore, the drain at the lower portion of the evaporator 7 is prevented from being frozen, and the freezing preventing effect can be achieved.

Figure 4:
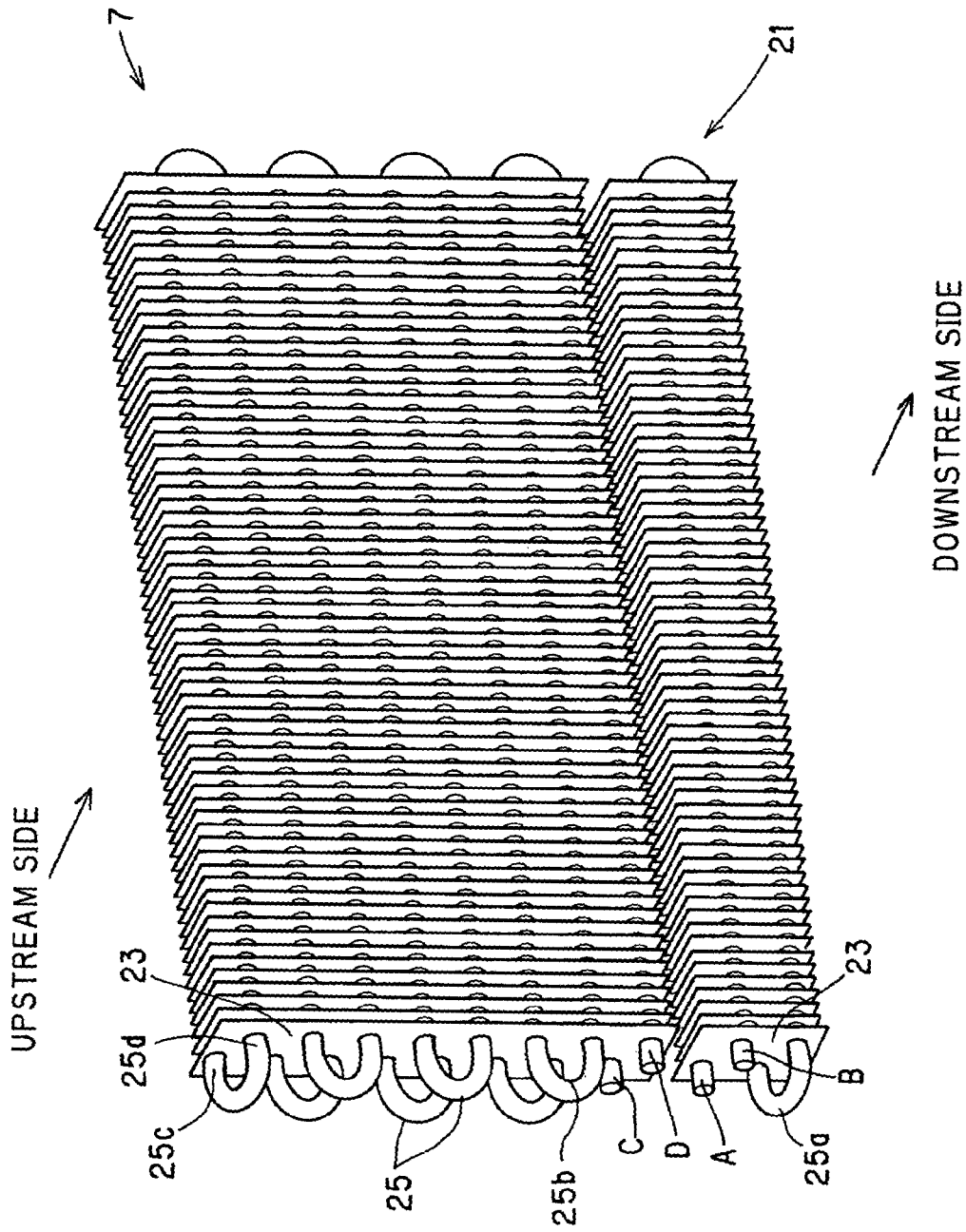
FIG. 4 is a perspective view showing an evaporator of another embodiment.

FIG. 4 shows another embodiment.

In this embodiment, the evaporator 7 and the radiator 21 are formed as separate fin structures, and the radiator 21 is disposed at the lower side of the evaporator 7. This structure also provides substantially the same effect as the above-described embodiment. If the radiator 21 and the evaporator 7 are constructed separately from each other as described above, the locating position of the radiator 21 is not limited to the lower portion of the evaporator 7. The radiator 21 may be disposed at a suitable place in accordance with a disposing space, for example, it may be located aside the evaporator 7 or at the upper side of the evaporator 7. When it is not disposed at the lower portion of the evaporator 7, it is needless to say that the freezing preventing effect cannot be achieved.

The present invention has been described on the basis of the embodiment, however, it is apparent that the present invention is not limited to the above embodiment.

The heat pump apparatus according to the present invention is applied to a case where the variation of the optimum refrigerant amount when the temperature of water being supplied rises is suppressed, to a case where the defrosting of the evaporator is efficiently performed, and to a heat pump type hot water supply apparatus, and the present invention is not limited to it and may be applied to a heating apparatus or the like.

The invention claimed is:

1. A heat pump apparatus having a refrigerating cycle, comprising:
    a compressor;
    a gas cooler;
    a pressure reducing device;
    an evaporator;
    a radiator arranged between the exit of said gas cooler and said pressure reducing device, wherein the gas cooler carries out heat exchange between refrigerant discharged from the compressor and water to heat the water, the radiator carries out heat exchange between the refrigerant from the gas cooler and air, and refrigerant working in a supercritical area is filled and used at a high-pressure side in the refrigerating cycle; and
    a defrosting mechanism comprising a bypass passage through which the refrigerant from the compressor bypasses the gas cooler and flows to the evaporator, and refrigerant flow passage switching means for controlling the flow of the refrigerant to the bypass passage,
    wherein both said evaporator and said radiator have a fin tube structure,
    wherein said radiator is constructed by a part of a refrigerant pipe extending from said gas cooler to said pressure reducing device, and
    wherein said radiator is disposed at the lower portion of said evaporator.

2. The heat pump apparatus as claimed in claim 1, wherein the refrigerant temperature at the exit of said radiator is kept at a substantially constant temperature irrespective of the temperature of supply water to said gas cooler.

3. The heat pump apparatus as claimed in any one of claims 1 and 2, wherein the part of said refrigerant pipe is disposed so as to penetrate through the lower portions of fins of said evaporator.

4. The heat pump apparatus as claimed in any one of claims 1 and 2, wherein the refrigerant is $CO_2$ refrigerant.

5. The heat pump apparatus as claimed in claim 1, wherein an inlet of the radiator is connected directly to an exit of the gas cooler via a tube.

* * * * *